UNITED STATES PATENT OFFICE.

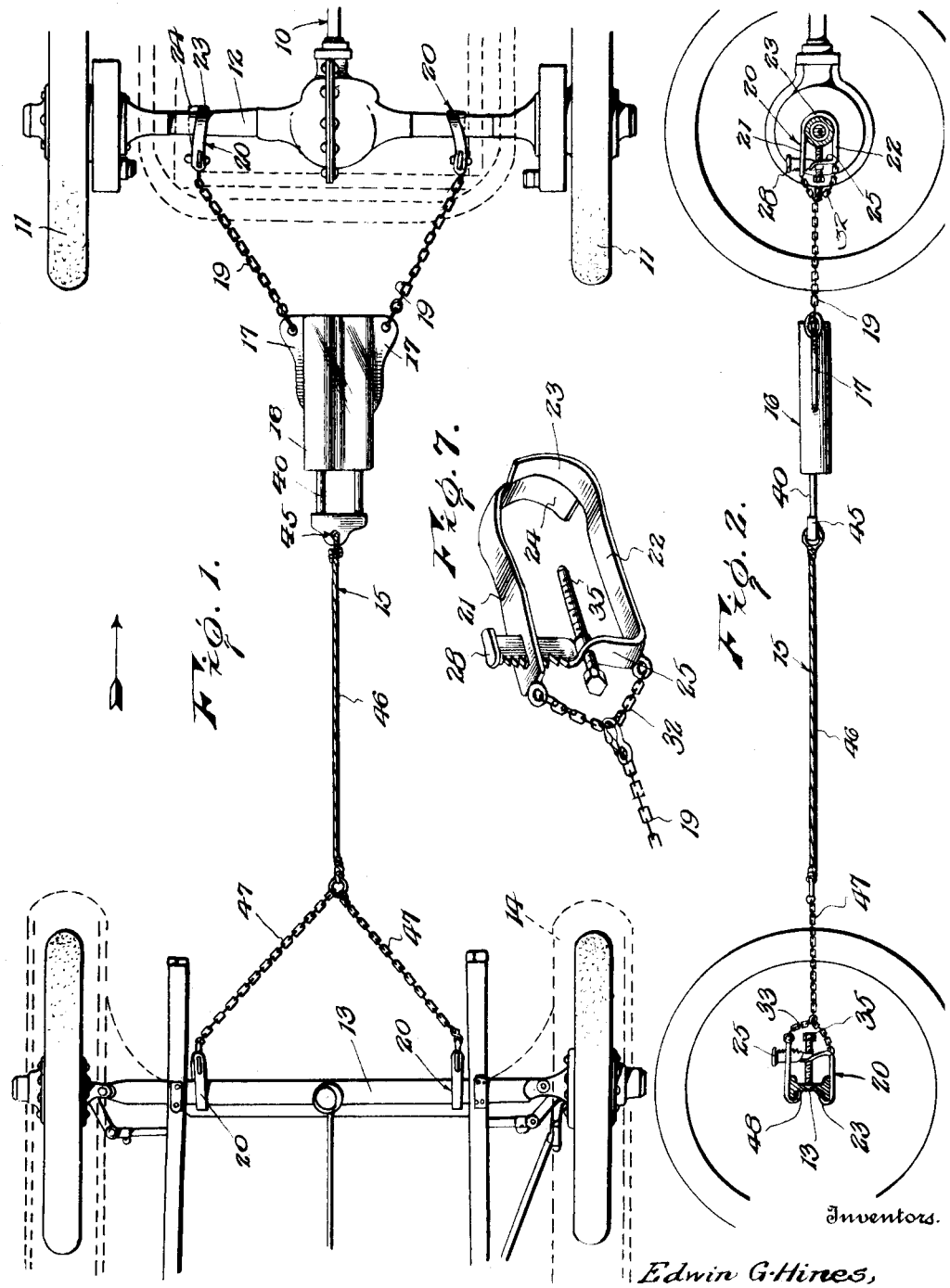

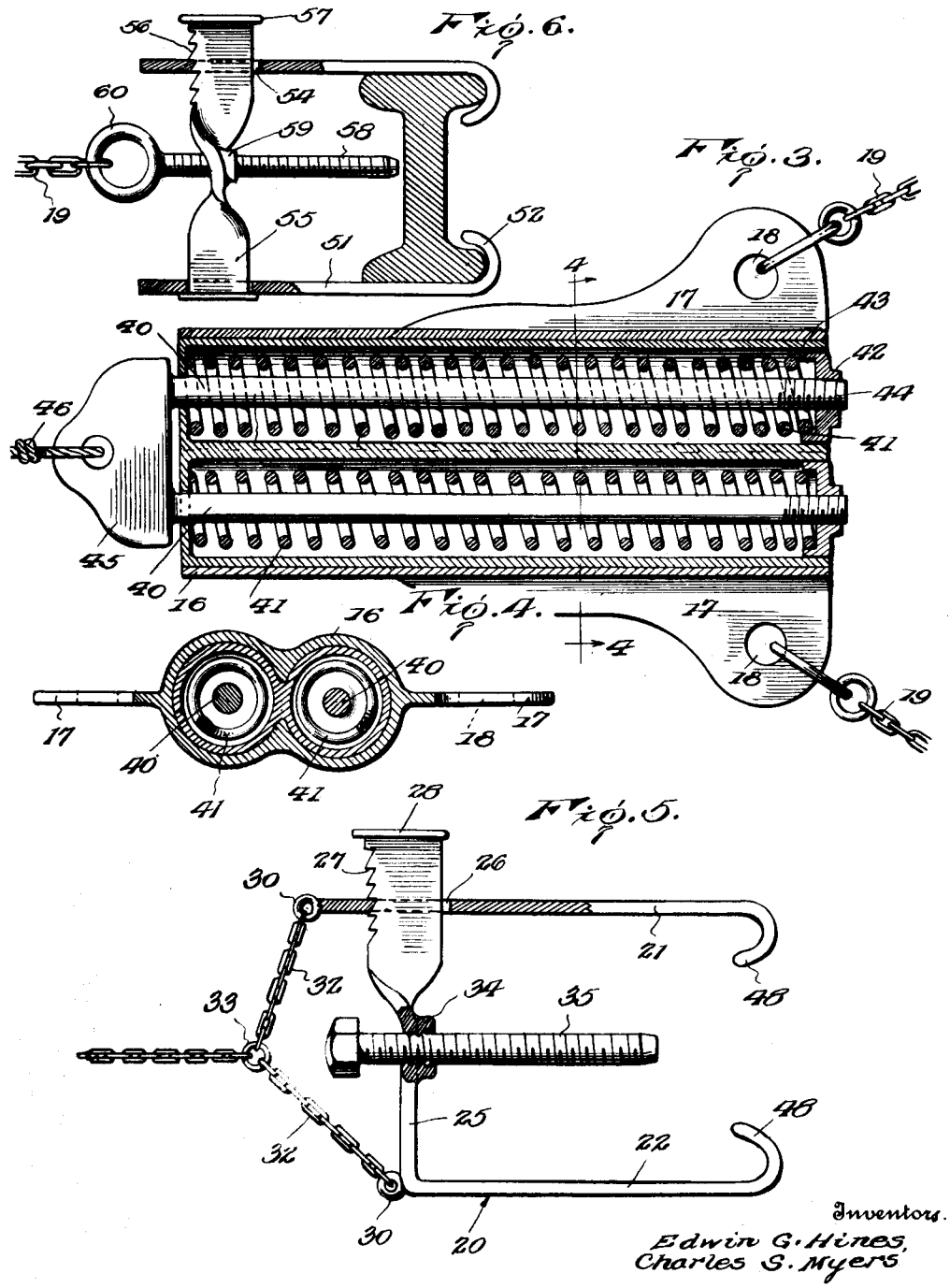

EDWIN G. HINES, OF DRUMS, AND CHARLES S. MYERS, OF HAZLETON, PENNSYLVANIA; SAID MYERS ASSIGNOR TO SAID HINES.

TOWING DEVICE.

1,384,835.  Specification of Letters Patent.  Patented July 19, 1921.

Application filed June 29, 1920. Serial No. 392,732.

*To all whom it may concern:*

Be it known that we, EDWIN G. HINES and CHARLES S. MYERS, citizens of the United States, residing at Drums and Hazleton, respectively, in the county of Luzerne and State of Pennsylvania, have invented certain new and useful Improvements in Towing Devices, of which the following is a specification.

This invention relates to improvements in tow lines especially adapted for use when it is desired to tow disabled or powerless vehicles, though not restricted to such use.

An important object of this invention is to provide a tow line of the class described having novel means for taking up shocks and strains incident to the passage of the towed vehicle over rough or uneven ground.

A further object of this invention is to provide a tow line of the class described having novel means whereby the same may be attached to the driven as well as the driving vehicle with a minimum of inconvenience and labor.

A further object of the invention is to provide a tow line of the class described which may be compactly arranged within any of the compartments of a motor vehicle.

A still further object of the invention is to provide a tow line of the class described which is efficient, desirable in use and cheap to manufacture.

Other objects and advantages of the invention will be apparent during the course of the following description.

In the accompanying drawings forming a part of this application and in which like numerals are employed to designate like parts throughout the same.

Figure 1 is a plan view of the improved tow line applied,

Fig. 2 is a side elevation of the same in use,

Fig. 3 is a horizontal section through the cushioning member of the tow line,

Fig. 4 is a central transverse vertical section taken on line 4—4 of Fig. 3,

Fig. 5 is a side elevation of an attaching device embodied in the invention, parts being shown in section, Fig. 6 is a side elevation of a modified form of attaching device, parts being shown in section, Fig. 7 is a perspective of the attaching device embodied in the invention.

In the drawings wherein for the purpose of illustration are shown several preferred embodiments of the invention, the numeral 10 generally designates the driving vehicle having, as usual, a source of power operatively connected to rear traction wheels 11. As illustrated in Fig. 1, the rear traction wheels 11 of the driving vehicle 10 have connection with an axle extended through the rear housing 12. The improved tow line herein illustrated and forming the subject of this application, is designed for connecting the forward or driving vehicle with the front axle 13 of a second vehicle, generally designated by the numeral 14, and which is either without a source of power or is, for some reason, temporarily disabled.

The improved tow line generally designated by the numeral 15, comprises a body 16 in the form of a pair of barrels having laterally projecting ears 17 having apertures 18 through which are extended one of the links of a pair of connecting chains 19. As illustrated in Fig. 1, the flexible elements 19 are connected at spaced points to the axle housing 12 through the medium of attaching devices, generally designated by the numeral 20.

As illustrated in Figs. 2 and 7, each attaching device 20 comprises arms 21 and 22 having their forward portions extended inwardly for forming hooks 23 and 24. The arms 21 and 22 are adapted to be extended on opposite sides of the housing 12 so that the hooked portions 23 and 24 of the same may be securely engaged with the housing. The rear end portion of the arm 22 is extended laterally to form a cross head 25 which, as illustrated in Fig. 5, is passed through an opening 26 in the rear portion of the arm 21. One longitudinal edge portion of the cross head 25 is formed with teeth 27 adapted to engage one end wall of the opening 26 so that the arms 21 and 22 may be adjusted with relation to each other and about the rear axle housing. By this means the attaching devices may be adjusted to securely engage rear axle housings of various sizes. The free end portion of the cross head 25 is flattened to form a stop element or shoulder 28 of a greater width and length than the width and length of the opening 26 so that the accidental removal of the arm 21 from engagement with the cross head is rendered impossible. Loops 30, carried by the arms 21 and 22, have connection with short connecting chains 32 which in turn are connected to the flexible elements 19 by a connecting loop 33. By this construction the draft is through the arms 21 and 22 to the rear axle housing 12 so that no great strain is placed upon the cross head 25. The intermediate portion of the cross head 25, which is preferably of flat metal, is provided with a half twist and an interiorly screw threaded boss 34 through which is extended a screw bolt 35 adapted for engaging the adjacent side of the axle housing for securely engaging the hooked portions 23 and 24 with the axle housing. By this construction, the attaching devices are securely connected to the rear axle housing and are not allowed to move upon the housing when once adjusted.

With particular reference to Figs. 1 and 3, it will be observed that a pair of draw rods 40 are extended longitudinally through the barrels 16 and are surrounded by retractile coil springs 41 having one of their end portions engaged with one end of the barrel and their other end portions engaged by adjusting nuts 42. The adjusting nuts are provided with annular flanges 43 which surround the adjacent end portions of the coil springs 41 so that the convolutions of the coil springs are not allowed to spread and pass rearwardly of the nuts. The nuts are adjustable longitudinally of the draw rods through the medium of screw threads 44 formed on the adjacent portions of the draw rods and when the adjusting nuts are moved in the direction of the head 45 of the draw rod, the yielding capacity of the springs is reduced.

The head 45 of the draw rods 40 is connected to a cable 46 or other suitable connecting device which in turn is connected to a second set of flexible elements 47 which may if desired be in the form of link chains.

The attaching devices 20 carried by the rear ends of the connecting elements 47 are similar in construction to the attaching devices engaged with the housing 12 with the exception that the ends of the arms 21 and 22 are bent inwardly upon themselves, as indicated at 48, so as to securely grip the flanges of the I beam from which the front axle is formed.

In the modified form of attaching device illustrated in Fig. 6, a pair of arms 51 have their end portions hooked, as indicated at 52, for engaging the flanges of the I beam from which the front axle of the trailing vehicle is formed. However, the attaching portions of the arms 51 may be formed similar to the curved hooks 23 and 24 adapted for engaging the rear axle housing of the driving vehicle. The rear end portions of the arms 51 are provided with alined openings 54 through which the end portions of the cross head 55 are extended. In this form of the invention one longitudinal edge portion of the cross head 55 is provided with a series of teeth 56 adapted to engage one end wall of one of the openings 54 for adjusting the arms 51 with relation to each other and on opposite sides of the axle or axle housing as the case may be. The end portions of the cross head 55 are flattened, as indicated at 57, so as to form a means for preventing the accidental removal of the cross head from engagement with either of the arms. A screw bolt 58 is threaded through a boss 59 formed in the intermediate portion of the cross head and is adapted to engage one side of the axle or axle housing for securely engaging the hooked portions 52 with the same. In addition to securely engaging the hooked portions 52 with the axle or axle housing, the screw bolt 58 serves as a means for connecting the chains 19 to the attaching device since the same is provided at its rear end with a loop 60.

In applying the improved trailing device, the attaching devices 20, carried by the chains or flexible elements 19, are rigidly secured to the rear axle housing of the driving vehicle by engaging the hooked portions 23 and 24 of the arms 21 and 22 of the same. Subsequent to engaging the hooked portions 23 and 24 with the rear axle housing, the screw bolts 35 are engaged with the adjacent side of the housing so that lateral movement of the attaching devices is prevented. By this means the draft is equalized and the paint on the axle housing is prevented from being scratched or chipped. The attaching devices carried by the chains or other flexible elements 47 may now be connected to the front axle 13 of the powerless or disabled vehicle 14. When the device is attached, as illustrated in Fig. 1, the driving vehicle may be set in motion for towing the disabled vehicle. As the driving and towed vehicles proceed any undue or excessive strain placed upon the towed vehicle will be absorbed to a high degree by the retractile coil springs 14 since the draft is necessarily through the springs. The sudden jerking incident to starting the driving vehicle is overcome to a great extent by the presence of the retractile coil springs 41. The strain under which the retractile coil springs 41 will act may be varied as desired by properly positioning the adjusting nuts 42 upon the draw rods 40.

After using the improved tow line, the same may be stored in any of the storage compartments of one of the vehicles without taking any great amount of storage space.

It is to be understood that the forms of the invention herewith shown and described are to be taken as preferred embodiments of the same and that such minor changes in construction and arrangement of parts may be made as will remain within the spirit of the invention and the scope of what is claimed.

Having thus described the invention, what is claimed as new is:

1. A tow line for vehicles comprising a barrel having laterally projecting connecting members at one end, a draw rod extended through said barrel, flexible elements connected to said draw rod, flexible elements connected to said laterally projecting connecting members, a coil spring surrounding said draw rod within said barrel, an adjusting device carried by said draw rod for tensioning said spring, and attaching means whereby to connect said flexible elements with the towing and the towed vehicle respectively.

2. A tow line for vehicles comprising a barrel having laterally projecting ears at an end, a draw rod slidably arranged within said barrel and extending through the opposite end thereof and provided with a head exteriorly of the latter end of the barrel, flexible elements connected to said head, flexible elements connected to said ears, a coil spring surrounding said draw rod within said barrel, an adjusting nut threaded on said draw rod and having an annular flange surrounding the adjacent end portion of said coil spring, said nut being adapted for tensioning said spring, and attaching devices carried by said flexible elements whereby to connect them to the towed and towing vehicles respectively.

In testimony whereof we affix our signatures.

EDWIN G. HINES. [L. S.]
CHARLES S. MYERS. [L. S.]